Dec. 1, 1953  E. E. WEST  2,661,230
KNOT TYING MECHANISM
Filed Sept. 24, 1948  6 Sheets-Sheet 1
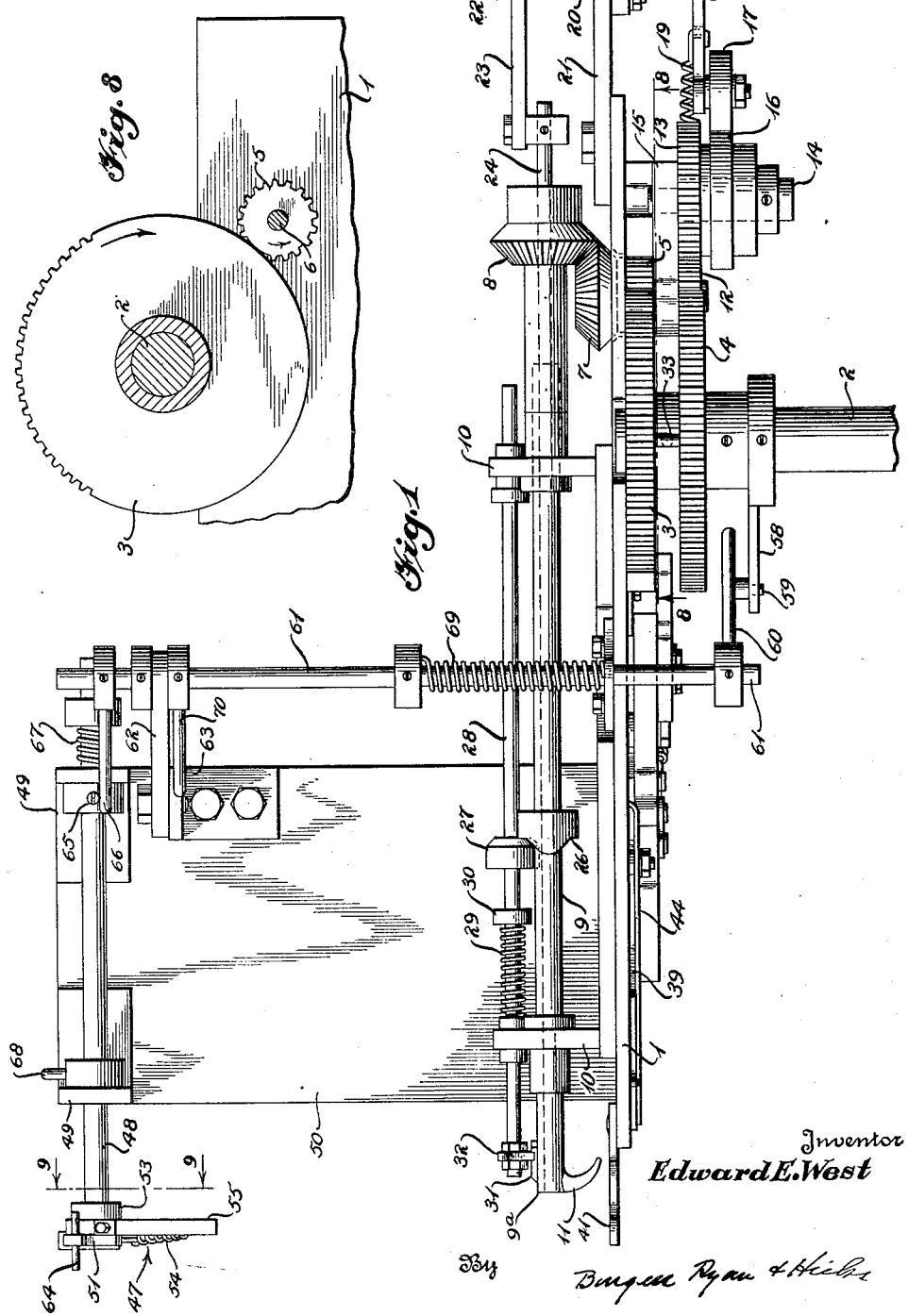
Inventor
Edward E. West
By
Burgess Ryan & Hicks
Attorneys Dec. 1, 1953  E. E. WEST  2,661,230
KNOT TYING MECHANISM.
Filed Sept. 24, 1948  6 Sheets-Sheet 2
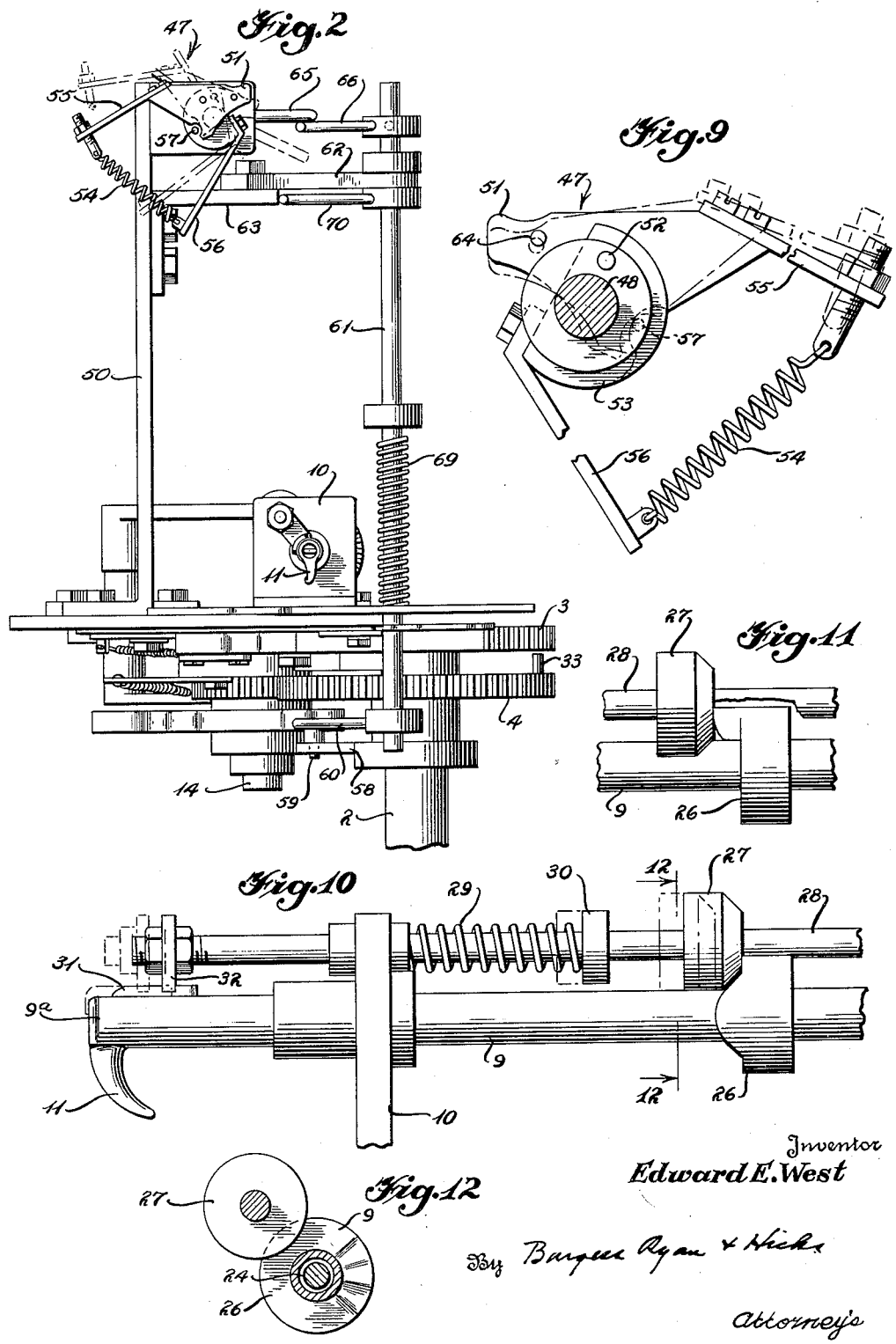

Dec. 1, 1953  E. E. WEST  2,661,230
KNOT TYING MECHANISM
Filed Sept. 24, 1948  6 Sheets-Sheet 3
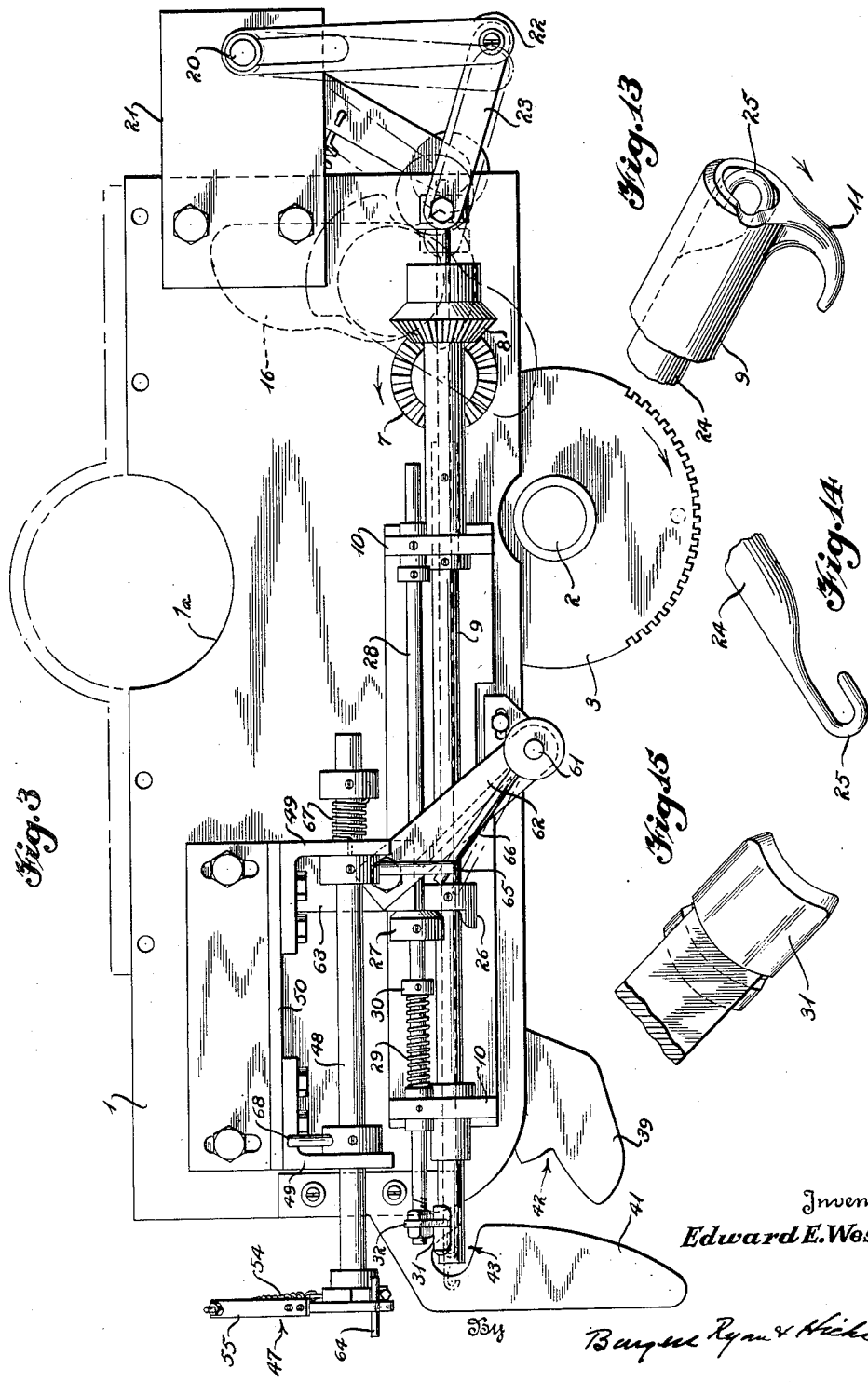
Inventor
Edward E. West Dec. 1, 1953 E. E. WEST 2,661,230
KNOT TYING MECHANISM
Filed Sept. 24, 1948 6 Sheets-Sheet 4
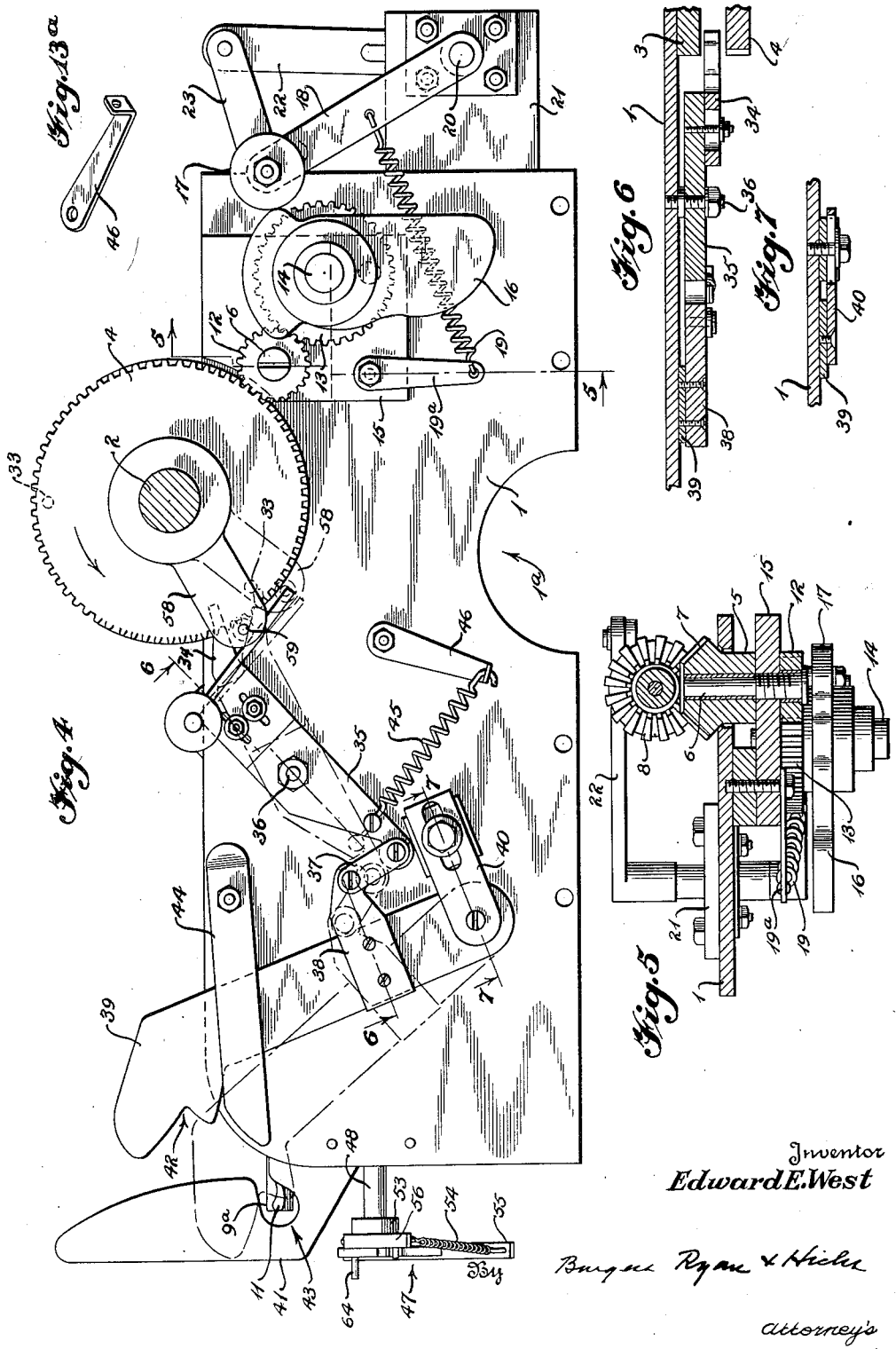
Inventor
Edward E. West
Burges Ryan & Hicks
Attorneys

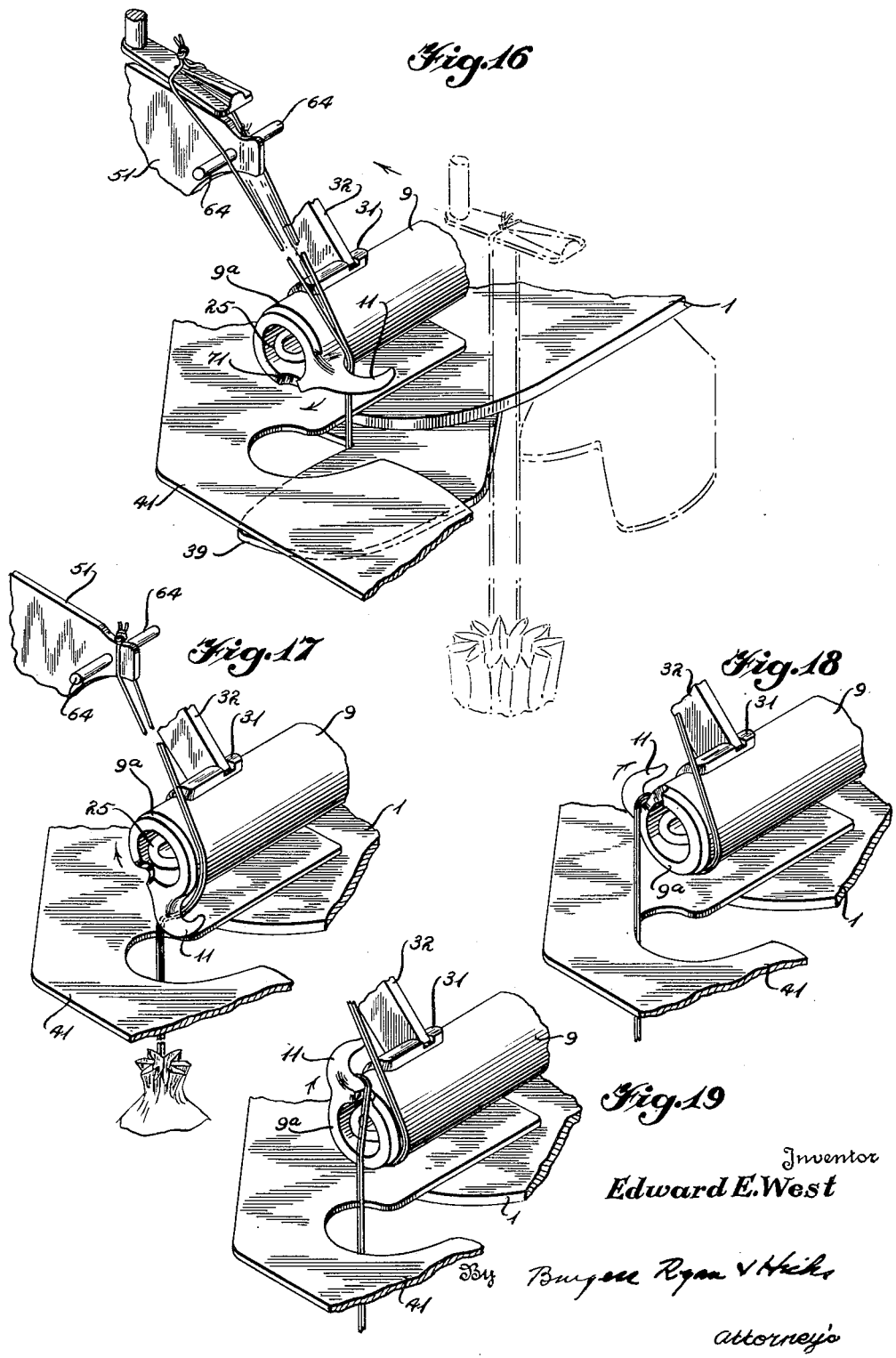

Dec. 1, 1953 E. E. WEST 2,661,230
KNOT TYING MECHANISM
Filed Sept. 24, 1948 6 Sheets-Sheet 6

Inventor
Edward E. West
By Burgess Ryan & Hicks
Attorneys

Patented Dec. 1, 1953

2,661,230

UNITED STATES PATENT OFFICE 2,661,230

KNOT TYING MECHANISM

Edward E. West, Richmond, Va.

Application September 24, 1948, Serial No. 51,042

13 Claims. (Cl. 289—12)

The present invention relates to improvements in knot tying mechanisms, and the method of tying a single loop bow knot. It relates more particularly to a mechanism for and the method of tying a knot in the drawstring of a container such as a bag of the open mesh, consumer type that has been filled with citrus fruit or the like.

The various objects and advantages of the invention will be apparent and best understood from the following description and the accompanying drawings in which:

Fig. 1 is a side elevation of a knot tying mechanism embodying the invention;

Fig. 2 is an end elevation of the knot tying mechanism illustrated in Fig. 1;

Fig. 3 is a plan view of the knot tying mechanism illustrated in Fig. 1;

Fig. 4 is a bottom view of the knot tying mechanism illustrated in Fig. 1;

Fig. 5 is a section view taken along the line 5—5 of Fig. 4;

Fig. 6 is a section view taken along the line 6—6 of Fig. 4;

Fig. 7 is a fragmentary view in section taken along the line 7—7 of Fig. 4;

Fig. 8 is a fragmentary view in section taken along the line 8—8 of Fig. 1;

Fig. 9 is a section view on an enlarged scale taken along the line 9—9 of Fig. 1;

Fig. 10 is a fragmentary view on an enlarged scale showing certain details of a knotter barrel and doffer;

Fig. 11 is a fragmentary view on an enlarged scale illustrating the doffer operating cams as shown in Fig. 10, but in advanced position;

Fig. 12 is a section view taken along the line 12—12 of Fig. 10;

Fig. 13 is a perspective view on an enlarged scale of the end of the knotter barrel and hook;

Fig. 13a is a perspective view of a spring holding and tensioning arm;

Fig. 14 is a perspective view on an enlarged scale of the end of the knotter hook;

Fig. 15 is a perspective view on an enlarged scale of the doffer;

Figs. 16 through 24 are perspective views illustrating the knot tying mechanisms at various stages of the knot tying operation.

Figure 20:
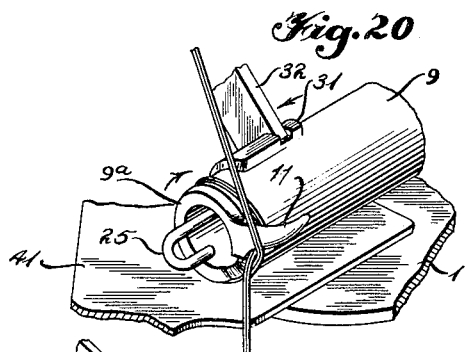

The illustrated embodiment of a mechanism for tying a knot in the drawstring of a bag is adapted to be used in conjunction with a bag filling machine of the type wherein a consumer type bag having a drawstring closure is filled and after filling the mouth of the bag is closed by the drawstring and the drawstring is tied by a knot tying mechanism such as described herein to keep the mouth of the bag closed. A bag filling machine of this type is fully illustrated and described in my copending application Serial No. 51,041 filed September 24, 1948, and wherein reference is made to this application. It will, of course, be understood that a knot tying mechanism embodying the present invention will have other uses in addition to its use with a bag filling machine.

As shown best in Figs. 1 and 3, there is a horizontal plate 1 on which the knot tying mechanism may be supported. The plate 1 has a cutout portion as indicated at 1a that is adapted to fit around a support, such as the central support of a bag filling machine, to which the plate 1 may be clamped so as to hold the knot tying mechanism supported thereon in a fixed position and at an appropriate location when used in conjunction with a bag filling machine.

As shown best in Fig. 1, a vertical drive shaft 2 that may be driven in a suitable manner; as for example, by the driving mechanism of a bag filling machine, extends at right angles to the plate 1. The drive shaft 2 carries a gear 3 positioned beneath the plate 1 and a gear 4 spaced from the gear 3. As shown in Fig. 8, a segment of the circumference of the gear 3 is provided with teeth that engage with and intermittently drives a spur gear 5 during a portion of each revolution of the drive shaft 2. The spur gear 5 has a cutout portion that registers with the gear 3 and permits the gear 3 to rotate while holding the spur gear 5 against rotation when it is not engaged by the segment of teeth on the gear 3.

The spur gear 5 is secured to a stub shaft 6 that extends through and is supported by the plate 1. The end of the stub shaft 6 extending above the plate 1 carries a bevel gear 7 that engages with and drives a second bevel gear 8. The second bevel gear 8 is secured to a tubular shaft 9 that extends horizontally above the plate 1 and is supported thereon in brackets 10. The end of the tubular shaft 9 forms a knotter barrel 9a that extends slightly beyond the end of the plate 1 and an inwardly curved, drawstring engaging finger 11 is carried at the end of the knotter barrel 9a. The knotter barrel 9a and the finger 11 carried thereon are, thus, intermittently rotated at an appropriate time for the knot tying operation during each revolution of the drive shaft 2.

As shown best in Figs. 4 and 5, the gear 4 carried on the drive shaft 2 is fully toothed and engages with and drives an idler gear 12 that is rotatably mounted on the stub shaft 6. The idler gear 12 engages with and drives a gear 13 that is secured to a second stub shaft 14. The shaft 14 is rotatably mounted on a support 15 that is carried beneath the plate 1. The shaft 14 carries a cam 16 that engages with a cam roller 17 carried on the end of a lever 18. A tension spring 19 secured to the lever 18 and to an arm 19a fixed to the support 15 holds the cam roller 17 in engagement with the cam 16. The lever 18 is secured to a rock shaft 20 that extends through and is supported by an extension 21 of the plate 1. The end of the rock shaft 20 extends above the plate 1 and carries a lever 22 that is connected by a link 23 to the end of a reciprocable rod 24 located inside of the tubular shaft 9. As shown best in Figs. 13 and 14, the rod 24 carries a drawstring engaging hook 25 at the end thereof and the rod 24 is positioned so that its hooked end will project into and out of the open end of the knotter barrel 9a as the rod 24 is reciprocated. The end of the lever 22 that is connected to the shaft 20 is slotted so that the length of the lever 22 and consequently its throw may be adjusted to regulate the distance the hooked end 25 of the rod 24 is drawn into the tubular shaft 9 as desired. During the operation of the knot tying mechanism, the rod 24 carrying the hook 25 is thus reciprocated in appropriately timed relation to the knot tying operation twice for each revolution of the drive shaft 2.

As shown best in Figs. 10, 11 and 12, the tubular shaft 9 carries a cam 26 that engages with a cam 27 secured to a reciprocable rod 28 supported above the tubular shaft 9 in the brackets 10. The cam 27 is resiliently held in engagement with the cam 26 by a spring 29 that surround the rod 28 and is located between one of the brackets 10 and a stop 30 secured to the rod 28. The end of the rod 28 is positioned above the knotter barrel 9a and carries a doffer 31 secured thereto by an arm 32.

As shown in Fig. 15, the doffer 31 is curved to fit the tubular shaft 9 and is moved along the top of the knotter barrel 9a as the rod 28 is moved. The doffer 31 is normally retracted and held in a position away from the end of the knotter barrel 9a. During the rotation of the tubular shaft 9, the doffer 31 is moved to the end of the knotter barrel 9a under the influence of the cams 26 and 27 at an appropriate time in the operation of the knot tying mechanism after a loop of the drawstring has been wrapped around the knotter barrel 9a to push the drawstring off of the knotter barrel.

The gear 4 on the drive shaft 2 also carries an upright pin 33 at its outer periphery. As shown best in Fig. 4, the pin 33 as it is rotated strikes a finger 34 carried on a pivoted drawstring guide operating lever 35 and moves the lever 35 to the position indicated by the dot and dash lines in Fig. 4. As shown in Figs. 4 and 6, the lever 35 is pivoted to the plate 1 on a bolt 36 and the finger 34 is adjustable lengthwise of the lever 35 so that the period it remains in engagement with the pin 33 and the length of throw of the lever 35 may be regulated as desired. The end of lever 35 is connected by a link 37 and an arm 38 to a movable drawstring guide 39.

As shown in Figs 4 and 7, the drawstring guide 39 is pivoted on a support 40 that is adjustably secured to the plate 1. The adjustment of the support 40 permits the guide 39 to be adjusted for the throw of the lever 35 so that the guide will swing into proper position relative to a fixed drawstring guide 41 as indicated by the dot and dash lines in Fig. 4. The end of the movable guide 39 is notched as indicated at 42 to engage with the drawstring of a bag and to carry the drawstring into a notch indicated at 43 in the fixed guide 41. When the movable guide 39 is moved to the position indicated by dot and dash lines in Fig. 4, the drawstring is held between the guides 39 and 41 and is positioned so that an upwardly extending portion of the drawstring will pass over the knotter barrel 9a for engagement with the finger 11 carried thereon as the shaft 9 is rotated.

The movable guide 39 may be supported at its free end by a leaf spring 44 that is secured to the plate 1. When the pin 33 releases the finger 34, the lever 35 is returned to the position indicated by full lines in Fig. 4 by a return spring 45. The return spring 45 is secured to the lever 35 and to an arm 46 that is secured to the plate 1. The arm 46 is adjustable on the plate 1 and may be positioned to control the tension of the return spring 45 as desired.

When the knotter is used in conjunction with a bag-filling machine such as described in my copending application Serial No. 51,041, previously referred to. The drawstring of a filled bag may be automatically transferred to a holding device which holds the drawstring in proper position for the tying of a knot therein.

As shown best in Fig. 1, a drawstring engaging mechanism indicated generally at 47 is supported at the end of a horizontal rock shaft 48 located above and slightly to the rear of the knotter barrel 9a. The rock shaft 48 is supported in brackets 49 carried by a plate 50 extending vertically from the plate 1. As shown best in Fig. 9, the drawstring engaging mechanism 47 consists of a drawstring engaging arm 51 that is pivoted at 52 on a collar 53 secured to the rock shaft 48. A spring 54 is connected between a member 55 extending from the rear of the arm 51 and a member 56 extending from the collar 53. The tension of the spring 54 urges the arm 51 upwardly until the end of a cutout portion of the arm 51 engages with a stop pin 57 carried by the collar 53.

To operate this drawstring holding mechanism, the drive shaft 2 carries an outwardly projecting, rotating arm 58 located beneath the gears 3 and 4. Once during each revolution of the drive shaft 2, the arm 58 strikes a lug 59 carried on an arm 60 that is secured to one end of a vertical rock shaft 61. As shown best in Fig. 2, the vertical rock shaft 61 extends through the plate 1 and is supported by the plate 1 and an arm 62 that is secured to a bracket 63 carried on the vertical plate 50.

As a bag is moved by the bag filling machine or other suitable mechanism into position for the knotting of the drawstring with the bag being supported by the looped end of its drawstring, the arm 51 enters the loop of the drawstring, as shown in Fig. 16, and as the drawstring continues to advance it engages with bars 64 extending from either side of the arm 51 and is pulled from its previous support onto the spring loaded arm 51. The spring 54 permits the arm 51 to be deflected by the weight of the bag that is suspended therefrom and this absorbs any shock that might otherwise tend to snap the drawstring.

A rod 65 is secured to the horizontal rock shaft 48 and engages with a stop 66 carried by the vertical rock shaft 61 to hold the arm 51 in a raised position for an appropriate time during the tying of a knot. When the proper time in the knot tying operation is reached, the stop 66 is moved out of engagement with the rod 65 and the pull on the drawstring engaging with the arm 51 causes the arm 51 and the rock shaft 48 to turn so that the looped end of the drawstring will be disengaged from the arm 51. Upon release of the drawstring, the rock shaft 48 is returned to its initial position by a torsion spring 67 that rotates the rock shaft 48 until a stop 68 carried thereon strikes one of the brackets 49. The vertical rock shaft 61 is returned to its initial position by a torsion spring 69 that rotates the rock shaft 61 until a stop 70 carried thereon strikes the bracket 63.

Figure 23:
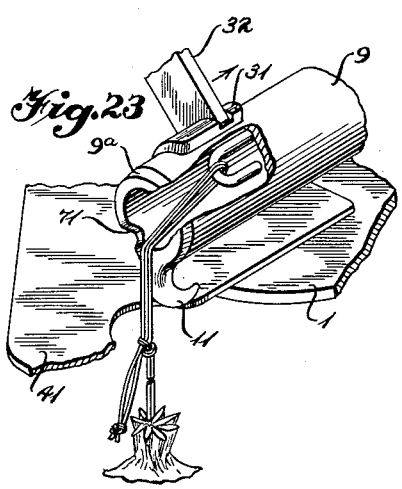
Figure 24:
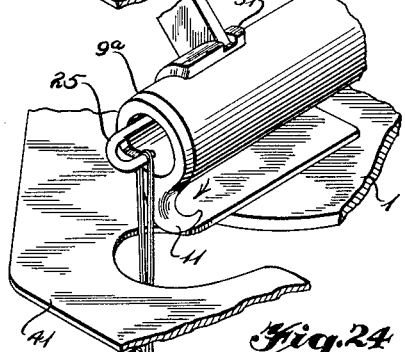
Figure 25:
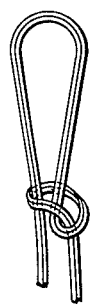
Fig. 25 is a perspective view of the knot tied by the knotting mechanism, but in loosened condition.

Figs. 16 through 24 illustrate the various steps in the method for tying of a knot in a drawstring as carried out by the apparatus that has just been described and Fig. 25 illustrates the knot as tied by the method thus illustrated.

In Fig. 16, the drawstring of the filled bag is shown as it is being brought into position for the initial knot tying operation. The guide 39 has been moved from its open position, indicated by the dot and dash lines, to its closed position where the drawstring is held between the guides 39 and 41 engaging with the upwardly extending portion of the drawstring passing over the knotter barrel 9a in a position where the drawstring may be engaged by the finger 11 on the knotter barrel 9a as the knotter barrel is rotated. At the same time, the looped end of the drawstring is transferred to the spring held drawstring engaging arm 51 which is located above and slightly behind the knotter barrel 9a so that the drawstring will extend at a slight angle across the knotter barrel 9a while it is supported in a fixed position on the arm 51.

Fig. 17 illustrates the engagement of the finger 11 on the knotter barrel 9a with the drawstring as the knotter barrel starts to rotate after the looped end of the drawstring has been transferred to the arm 51. Figs. 18 and 19 illustrate the partial wrapping or looping of the drawstring about the knotter barrel 9a when the knotter barrel has rotated approximately one half a turn and three quarters of a turn, respectively. As shown in Fig. 9, the downwardly extending portion of the drawstring falls into a notch 71 cut into the end of the knotter barrel 9a next to the knotter finger 11 as the knotter barrel rotates and as the knotter barrel 9a continues to rotate approaching a complete turn, as shown in Fig. 20 the upwardly extending portion of the drawstring strikes the back of the knotter finger 11 and is guided across the downwardly extending portion of the drawstring.

Figure 21:
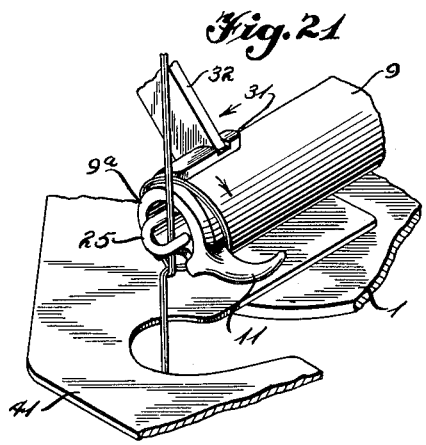
Figure 22:
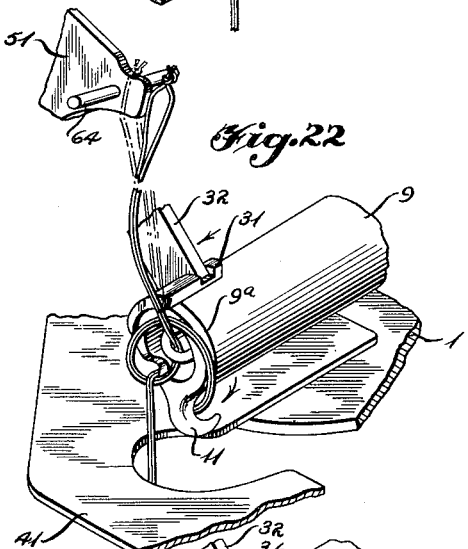

As shown in Fig. 20 the hooked end 25 of the reciprocable rod 24 starts to emerge from the knotter barrel 9a. As the knotter barrel 9a completes a full turn, the upwardly extending portion of the drawstring slips over the back of the knotter finger 11 to a position in front of the open end of the knotter barrel 9a and across the open loop of the drawstring wrapped thereon, as shown in Fig. 21. At this position the hook 25 engages with the portion of the drawstring extending across the open end of the knotter barrel and the doffer 31 also starts to move toward the end of the knotter barrel 9a. When the knotter barrel 9a reaches a position where the knotter finger 11 extends downwardly, as shown in Fig. 22, the doffer 31 pushes the loop of the drawstring that has been formed about the knotter barrel 9a from the knotter barrel and the hook 25 then draws a doubled portion of the drawstring into the open end of the knotter barrel 9a. At this time the arm 51 is released by disengaging the stop 66 from the arm 65 thus, permitting the arm 51 to be pulled downwardly to release the looped end of the drawstring as shown also in Fig. 22.

As the looped end of the drawstring is released by the arm 51, the hook 25 draws the doubled portion of the drawstring that forms the loop of a bow into the tubular shaft 9 as shown in Fig. 23 and the weight of the bag pulls the drawstring from the knotter finger 11 and draws the knot tight. The doffer 31 has also been returned to its initial position at this time. When the knot has been drawn tight, the hook 25 is then moved out of the end of the tubular shaft 9, as shown in Fig. 24, to release the doubled loop or bow of the drawstring therefrom. During the operations just described the bag may be raised and lowered by a hopper such as is shown and described in my copending application Serial No. 51,041 referred to previously, to relieve the tension in the drawstring as the knot is being tied.

The knot that has been tied is shown in Fig. 25 and is a bow knot having a single loop. With the present mechanism the loop of this bow knot may be drawn as long as desired by regulating the movement of the hook 25. When a bow knot having a long loop and a short free end is tied in this manner, persons handling the bag will not unintentionally pull out the knot by pulling on the free end of the drawstring. However, the knot may be readily untied, when desired, by pulling the free end of the drawstring to replace articles in the bag that may have become damaged or spoiled.

It will be understood the embodiment of the invention as shown and described herein is for illustrative purposes only and it will be apparent that various changes and modifications may be made therein by those skilled in the art without departing from the scope of the invention as defined by the claims appended hereto.

I claim:

1. In a machine for tying a knot in a drawstring of a bag, the combination of a rotatable knotter barrel, a drawstring engaging finger, a pivoted arm positioned above the rotatable knotter barrel, said arm entering the looped end of a drawstring and supporting a filled bag by said drawstring with a portion of the drawstring intermediate the ends thereof extending across the knotter barrel, a support on which said arm is pivoted, means for limiting the pivoted movement of the arm about said support, and a spring connected between the arm and the support, said spring urging the arm toward the upper limit of its pivotal movement.

2. In a mechanism for tying a knot in a drawstring of a container such as a bag, the combination as defined in claim 1 which includes a rock shaft on which said drawstring engaging arm and the support therefor are carried, said shaft being rotatable through said arm and the drawstring carried thereon to move said arm from a drawstring supporting position to a position for releasing the drawstring from said arm, releasable means engaging with the rock shaft for holding the rock shaft and drawstring engaging arm in the first-mentioned position and a spring connected to said rock shaft for returning said shaft and said arm to the first-mentioned position upon release of the drawstring from said arm.

3. In a mechanism for tying a knot in a drawstring for a container such as a bag, the combination including a rotatable knotter barrel, a pair of opposing guides located beneath the rotatable knotter barrel, said guides including a fixed drawstring positioning guide and a movable drawstring positioning guide supported in opposed relation to said fixed guide, said movable guide being movable into open and closed relation to said fixed guide for engaging with and positioning a drawstring between said guides, a spring secured to said movable guide and normally holding said movable guide in its open position, and means for intermittently closing said movable guide upon engagement of the drawstring therewith.

4. In a mechanism for tying a bow knot having a single loop of predetermined length in the drawstring of a container such as a bag, the combination including a rotatable knotter barrel, said knotter barrel being tubular and having an opening extending therethrough, a drawstring engaging finger carried by said knotter barrel, a drawstring engaging hook reciprocably mounted in said knotter barrel and a linkage connecting said drawstring engaging hook to a drive means for moving said hook from a position where said hook projects from the open end of said knotter barrel to a position within said knotter barrel, the connection of said linkage to said drawstring engaging hook being adjustable for regulating the distance the hook is moved thereby within the knotter barrel.

5. In a mechanism for tying a knot in the drawstring of a container such as a bag, the combination of a tubular rotatable knotter barrel, a drawstring engaging finger carried by the knotter barrel at one end thereof and extending rearwardly along the side of the knotter barrel, said finger engaging with a drawstring at a point intermediate the ends thereof upon rotation of the barrel, a drawstring engaging hook reciprocably supported within the knotter barrel, said hook being reciprocable between a position within the barrel and a drawstring engaging position outside of the barrel and a reciprocable doffer located on the outside of the knotter barrel, said doffer being reciprocable between a point spaced inwardly from the end of the barrel and the end thereof.

6. In a mechanism for tying a knot in the drawstring of a container such as a bag, the combination of a tubular rotatable knotter barrel, a drawstring engaging finger carried by the knotter barrel at one end thereof and extending rearwardly along the side of the knotter barrel, said finger engaging with a drawstring at a point intermediate the ends thereof upon rotation of the barrel, a drawstring supporting arm positioned above the end of the knotter barrel, said arm engaging with and supporting the free end of the drawstring with the drawstring in position for engagement with the drawstring engaging finger, a drawstring engaging hook reciprocably supported within the knotter barrel, said hook being reciprocable between a position within the barrel and a drawstring engaging position outside of the barrel and a reciprocable doffer located on the outside of the knotter barrel, said doffer being reciprocable between a point spaced inwardly from the end of the barrel and the end thereof.

7. In a mechanism for tying a knot in the drawstring of a container such as a bag, the combination of a tubular rotatable knotter barrel, a drawstring engaging finger carried by the knotter barrel at one end thereof and extending rearwardly along the side of the knotter barrel, said finger engaging with a drawstring at a point intermediate the ends thereof upon rotation of the barrel, a drawstring supporting arm positioned above the end of the knotter barrel, said arm being positioned to hold the free end of the drawstring with the drawstring in position for engagement with the drawstring engaging finger, a pair of opposed drawstring guides located beneath the knotter barrel, one of said guides being movable and the other of said guides being fixed, said movable guide engaging with and supporting with a portion of the drawstring extending below the knotter barrel and positioning the drawstring for engagement with the drawstring engaging finger, a drawstring engaging hook reciprocably supported within the knotter barrel, said hook being reciprocable between a position within the barrel and a drawstring engaging position outside of the barrel and a reciprocable doffer located on the outside of the knotter barrel, said doffer being reciprocable between a point spaced inwardly from the end of the barrel and the end thereof.

8. In a mechanism for tying a knot in the drawstring of a container such as a bag, the combination of a tubular rotatable knotter barrel, a drawstring engaging finger carried by the knotter barrel at one end thereof and extending rearwardly along the side of the knotter barrel, said finger engaging with a drawstring at a point intermediate the ends thereof upon rotation of the barrel, a drawstring engaging hook reciprocably supported within the knotter barrel, said hook being reciprocable between a position inside of the barrel and a drawstring engaging position outside of the barrel, a linkage connecting the hook to a drive means for reciprocating the same, said linkage having an adjustable throw for regulating the distance the hook is drawn into the barrel, and a reciprocable doffer located on the outside of the knotter barrel, said doffer being reciprocable between a point spaced inwardly from the end of the barrel and the end thereof.

9. In a mechanism for tying a knot in the drawstring of a container such as a bag, the combination of a tubular rotatable knotter barrel, a drawstring engaging finger carried by the knotter barrel at one end thereof and extending rearwardly along the side of the knotter barrel, said finger engaging with a drawstring at a point intermediate the ends thereof upon rotation of the barrel, resilient means engaging with the free end of the drawstring and supporting the drawstring in position for engagement with the drawstring engaging finger, a drawstring engaging hook reciprocably supported within the knotter barrel, said hook being reciprocable between a position within the barrel and a drawstring engaging position outside of the barrel and a reciprocable doffer located on the outside of the knotter barrel, said doffer being reciprocable between a point spaced inwardly from the end of the barrel and the end thereof.

10. In a mechanism for tying a not in the drawstring of a container such as a bag, the combination of a tubular rotatable knotter barrel, a drawstring engaging finger carried by the knotter barrel at one end thereof and extending rearwardly along the side of the knotter barrel, said finger engaging with a drawstring at a point intermediate the ends thereof upon rotation of the barrel, means engaging with the end of the drawstring and resiliently supporting the drawstring in position for engagement with the drawstring engaging finger, release means operable by rotation of the knotter barrel for releasing said supporting means from engagement with the drawstring upon completion of one revolution of the knotter barrel, a drawstring engaging hook reciprocably supported within the knotter barrel, said hook being reciprocable between a position within the barrel and a drawstring engaging position outside of the barrel and a reciprocable doffer located on the outside of the knotter barrel, said doffer being reciprocable between a point spaced inwardly from the end of the barrel and the end thereof and being positioned to engage with the loop of the drawstring on the barrel upon movement toward the end of the barrel.

11. In a mechanism for tying a knot in the drawstring of a container such as a bag, the combination of a tubular rotatable knotter barrel, a drawstring engaging finger carried by the knotter barrel at one end thereof and extending rearwardly along the side of the knotter barrel, said finger engaging with a drawstring at a point intermediate the ends thereof upon rotation of the barrel, means engaging with one end of the drawstring and resiliently supporting the drawstring in position for engagement with the drawstring engaging finger, a drawstring engaging hook reciprocably supported within the knotter barrel, said hook being reciprocable between a position within the barrel and a drawstring engaging position outside of the barrel and a reciprocable doffer located on the outside of the knotter barrel, said doffer being reciprocable between a point spaced inwardly from the end of the barrel and the end thereof and guide means engaging with a portion of the drawstring beneath the barrel, said guide means engaging with and positioning the drawstring with respect to the drawstring engaging finger on the knotter barrel.

12. In a mechanism for tying a knot in the drawstring of a container such as a bag, the combination of a tubular, rotatable knotter barrel, a drawstring engaging finger carried by the knotter barrel at one end thereof and extending rearwardly along the side of the knotter barrel, said finger engaging with a drawstring at a point intermediate the ends thereof upon rotation of the barrel, means engaging with the end of the drawstring and resiliently supporting the drawstring in position for engagement with the drawstring engaging finger, said means including a spring-loaded arm positioned above the end of the knotter barrel to receive the end of the drawstring thereon, a drawstring engaging hook reciprocably supported within the knotter barrel, said hook being reciprocable between a position within the barrel and a drawstring engaging position outside of the barrel and a reciprocable doffer located on the outside of the knotter barrel, said doffer being reciprocable between a point spaced inwardly from the end of the barrel and the end thereof.

13. In a mechanism for tying a knot in the drawstring of a container such as a bag, the combination of a tubular rotatable knotter barrel, a drawstring engaging finger carried by the knotter barrel at one end thereof and extending rearwardly along the side of the knotter barrel, said finger engaging with a drawstring at a point intermediate the ends thereof upon rotation of the barrel, resilient means engaging with one end of the drawstring and supporting the drawstring in position for engagement with the drawstring engaging finger, said resilient means including a spring-loaded arm positioned above the end of the knotter barrel to receive the end of the drawstring thereon, a rock shaft supporting said spring-loaded arm in drawstring engaging position, means operable by the knotter barrel upon completion of one revolution thereof for releasing the rock shaft and the arm from said position, a drawstring engaging hook reciprocably supported within the knotter barrel, said hook being reciprocable between a position within the barrel and a drawstring engaging position outside of the barrel and a reciprocable doffer located on the outside of the knotter barrel, said doffer being reciprocable between a point spaced inwardly from the end of the barrel and the end thereof.

EDWARD E. WEST.

References Cited in the file of this patent

UNITED STATES PATENTS

| Number | Name | Date |
|---|---|---|
| 238,327 | Augspurger | Mar. 1, 1881 |
| 267,936 | Rice | Nov. 21, 1882 |
| 286,819 | Hodges | Oct. 16, 1883 |
| 492,591 | Stark | Feb. 28, 1893 |
| 1,099,128 | Poege, Jr. | June 2, 1914 |
| 1,125,666 | Dalton | Jan. 19, 1915 |
| 1,155,860 | Witte | Oct. 5, 1915 |
| 1,774,898 | Novick | Sept. 2, 1930 |
| 1,830,208 | Norling | Nov. 3, 1931 |
| 2,010,591 | Haynes et al. | Aug. 6, 1935 |
| 2,239,342 | Rosenfelder | Apr. 22, 1941 |